G. J. CLAYTON.
POWER BRAKE FOR AUTOMOBILES.
APPLICATION FILED FEB. 17, 1912.

1,047,384.

Patented Dec. 17, 1912.

3 SHEETS—SHEET 3.

Witnesses

Inventor
G. J. Clayton

Attorney

UNITED STATES PATENT OFFICE.

GEORGE J. CLAYTON, OF LAKEWOOD, NEW JERSEY.

POWER-BRAKE FOR AUTOMOBILES.

1,047,384.   Specification of Letters Patent.   Patented Dec. 17, 1912.

Application filed February 17, 1912. Serial No. 678,295.

*To all whom it may concern:*

Be it known that I, GEORGE J. CLAYTON, a citizen of the United States, residing at Lakewood, in the county of Ocean, State of New Jersey, have invented certain new and useful Improvements in Power-Brakes for Automobiles; and I do hereby declare the following to be a full, clear, and exact description of the invention, such as will enable others skilled in the art to which it appertains to make and use the same.

This invention relates to automobile brakes and has for an object to provide novel cam means for operating a cone nut clutch, this means being driven from the driving shaft of the rear axle and being controlled through the instrumentality of a pedal.

A second object of the invention is to provide novel spring controlled locking means for holding the pedal depressed when desired.

With the above objects in view the invention consists of certain novel details of construction and combination of parts hereinafter fully described and claimed, it being understood that various modifications may be made in the minor details of construction within the scope of the appended claim.

Figure 1:
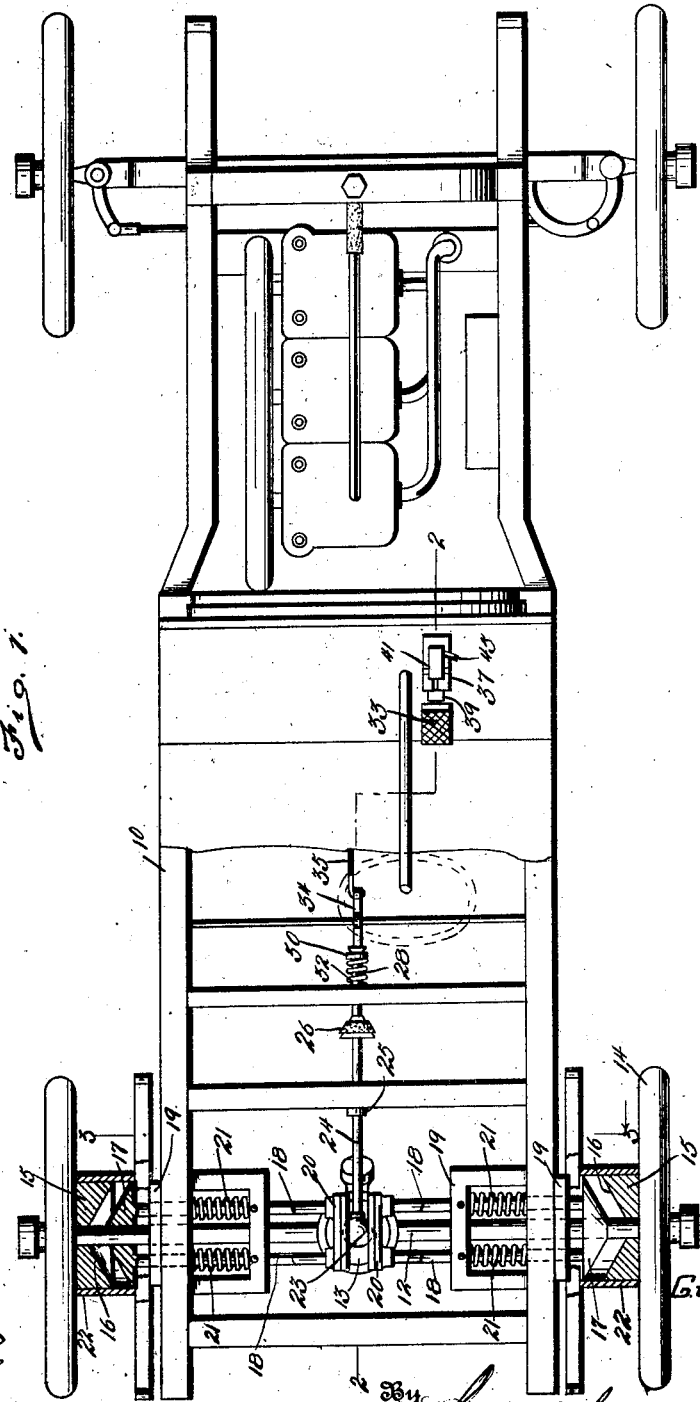
Figure 2:
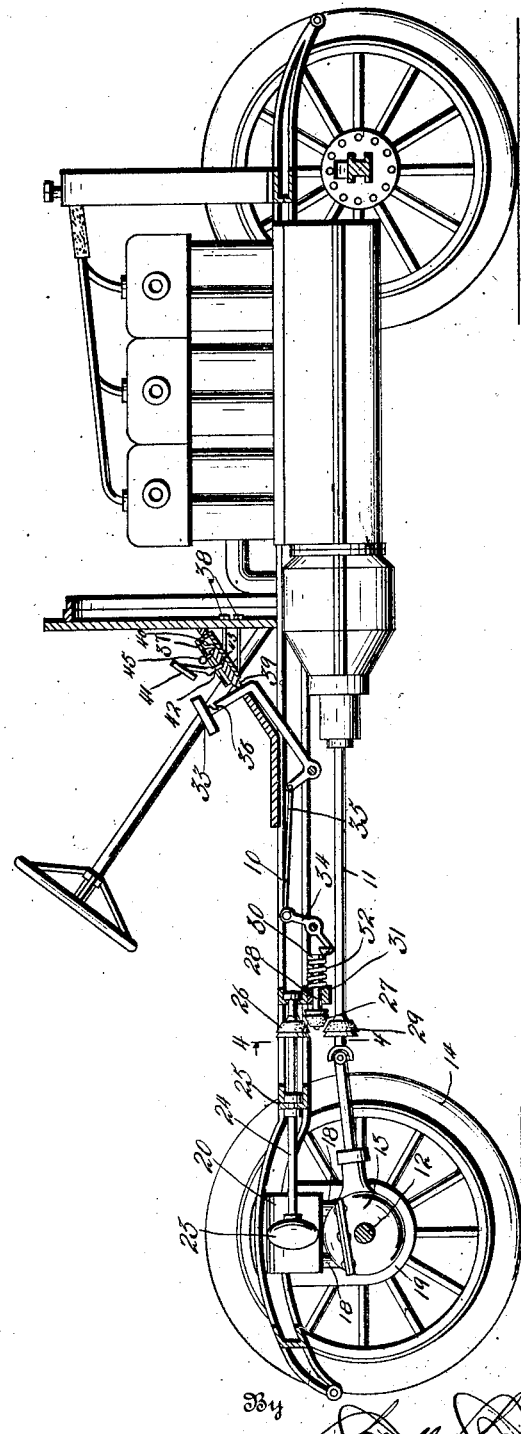
Figure 3:
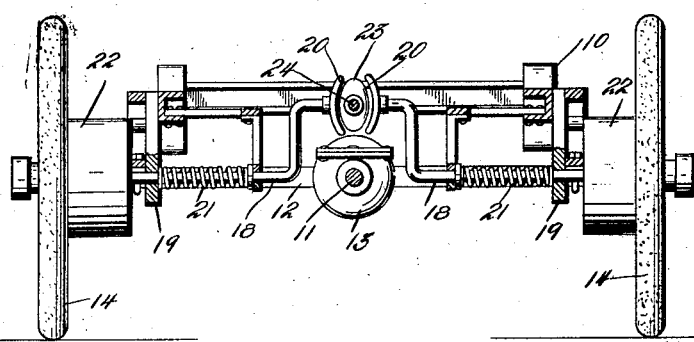
Figure 4:
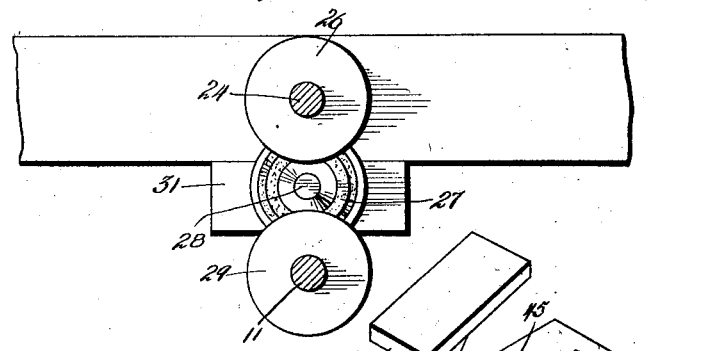
Figure 5:
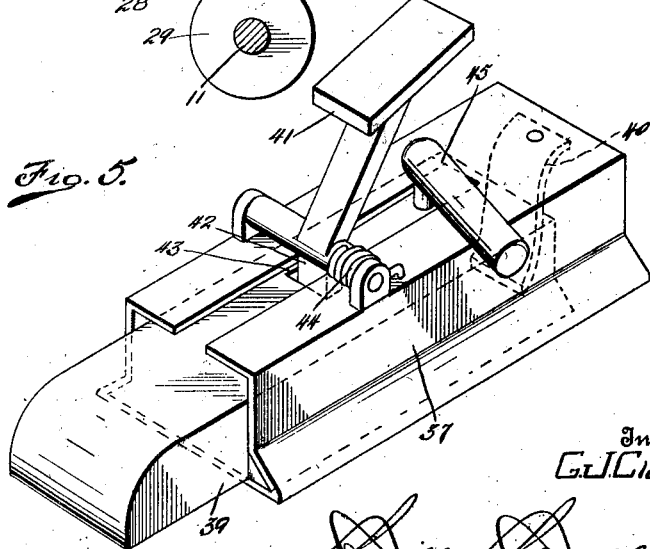

In the accompanying drawings forming part of this specification:—Figure 1 is a plan view of an automobile chassis with portions broken away and showing my improved brake mechanism assembled therewith. Fig. 2 is a longitudinal sectional view taken on the line 2—2 Fig. 1. Fig. 3 is a cross sectional view taken on the line 3—3 Fig. 1. Fig. 4 is a detail cross sectional view taken on the line 4—4 Fig. 2. Fig. 5 is a detail perspective view of the pedal locking mechanism.

Referring now to the drawings in which like characters of reference designate similar parts, 10 designates in general the automobile chassis, 11 the driving shaft, 12 the rear axle carrying the usual differential gear 13, and 14 the rear wheels.

The wheels 14 are each provided with a clutch member 15 having a conical opening 16 into which slides a cone clutch member 17 that is slidably mounted on the axle 12. Each cone clutch member is provided on the rear face with spaced parallel rods 18 which are slidably fitted in a bearing block 19 carried upon the axle, and are connected at their free ends by a concave head member 20. The rods 18 of both cone clutch members are offset near the inner ends in order to elevate the concave head members above the differential gear casing as clearly shown in Fig. 3. Helical springs 21 are seated on the rods and serve to hold the cone clutch members out of engagement with the mating clutch members. A cylindrical casing 22 encircles and houses each mating cone clutch member 17 and clutch member 15 so that dust and other foreign matter is prevented from entry between the working faces of the members.

For sliding the cone clutch members into operative position, I provide a substantially egg shaped cam 23 the long axis of which extends in a vertical plane, this cam being carried upon the end of a stub shaft 24 which is journaled in a suitable bearing 25 and is provided with a friction gear 26 that is adapted to mesh with a clutch pinion 27 carried upon a spring controlled stub shaft 28, the clutch pinion 27 being in turn adapted to mesh with a friction gear 29 carried upon the driving shaft 11. The stub shaft 28 is provided remote from the clutch pinion with a disk head 30 and seated on this shaft between this head and the bearing 31 of the shaft is a helical spring 32 which normally serves to hold the pinion heads disengaged. Upon pressure being exerted upon the disk head 30, the pinion is slid into engagement with both of the gears 29 and 26. Upon rotation of the shaft 24, the cam 23 will be rotated until the long axis extends in a horizontal plane and in this position of the parts the cam will bear against and force outwardly the concave head 20 and hold the cone clutch members seated in the related clutch members.

For actuating the brake, the brake pedal 33 is connected to one leg of a pivoted angular lever 34 through the instrumentality of a connecting rod 35, the angular lever bearing against the disk head 28 of the clutch pinion shaft and moving the clutch pinion into operative engagement with the friction gears 26 and 29, upon depression of the pedal. Upon release of the pedal, the helical spring 32 of the clutch pinion and helical springs 21 of the cam clutch member rods operate to return the parts to inactive position.

In order to hold the brake applied in going down grades and under other conditions of service, I provide a notch 36 in the pedal, and upon the pedal floor of the automobile I countersink a substantially rectangular casing 37 which is secured to the dash by bolts 38. Slidably fitted in the casing is a trigger 39, a spring 40 being secured to the casing in rear of the trigger and serving normally to move the latter outwardly and into the notch of the pedal when the latter is depressed.

To normally hold the trigger in cocked position I provide a pedal 41 having a tongue 42 which projects into a notch 43 arranged in the top face of the trigger, a helical spring 44 being assembled with the gudgeon of the pedal to hold the latter in position for locking the pedal in cocked position against the tension of its spring. Upon depression of the pedal, the locking tongue will be disengaged from the trigger, and the latter will be urged by its spring into operative engagement with the notch 36 in the brake pedal. For cocking the trigger, I provide a foot lug 45 on the top face of the trigger, and upon this lug being shoved rearwardly by the foot, the trigger is carried rearwardly against the tension of its spring until the locking tongue drops into the notch of the trigger and holds the latter cocked.

What is claimed, is:—

A motor vehicle brake, the combination with an axle and a pair of wheels carried thereby, of cone clutch members slidably mounted on said axle and operatively engaging said wheels, rods carried by said cone clutch members and terminating at their inner ends in heads having confronting concaved faces, a stub shaft adapted to be driven by the driving shaft of said motor vehicle, a substantially oval cam member carried by said stub shaft and operating to engage said concaved faces and simultaneously move said cone clutch members into operative position, and tension means carried by said rods for releasing said cone clutch members.

In testimony whereof, I affix my signature, in presence of two witnesses.

GEORGE J. CLAYTON.

Witnesses:
R. TEN BROECK STOUT,
CLARA K. LIPP.